Sept. 16, 1952     D. H. BALLANTYNE ET AL     2,610,466
GAS TURBINE ENGINE WITH STARTING DEVICE
AND AUTOMATIC FUEL CONTROL MEANS
Filed June 24, 1949
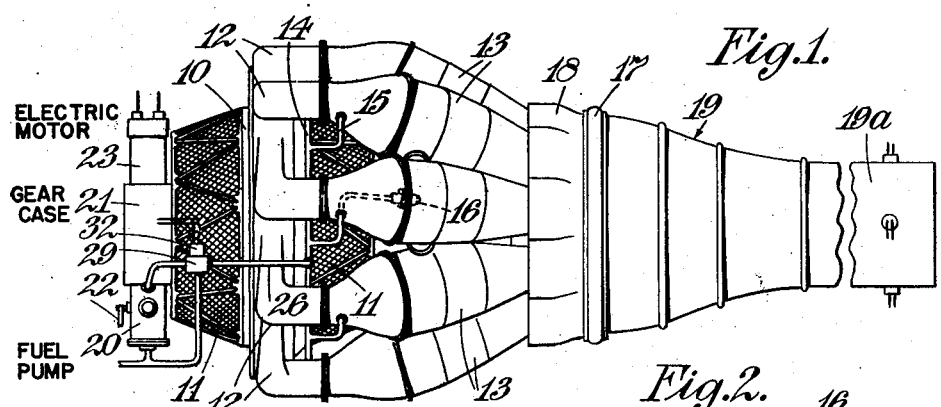
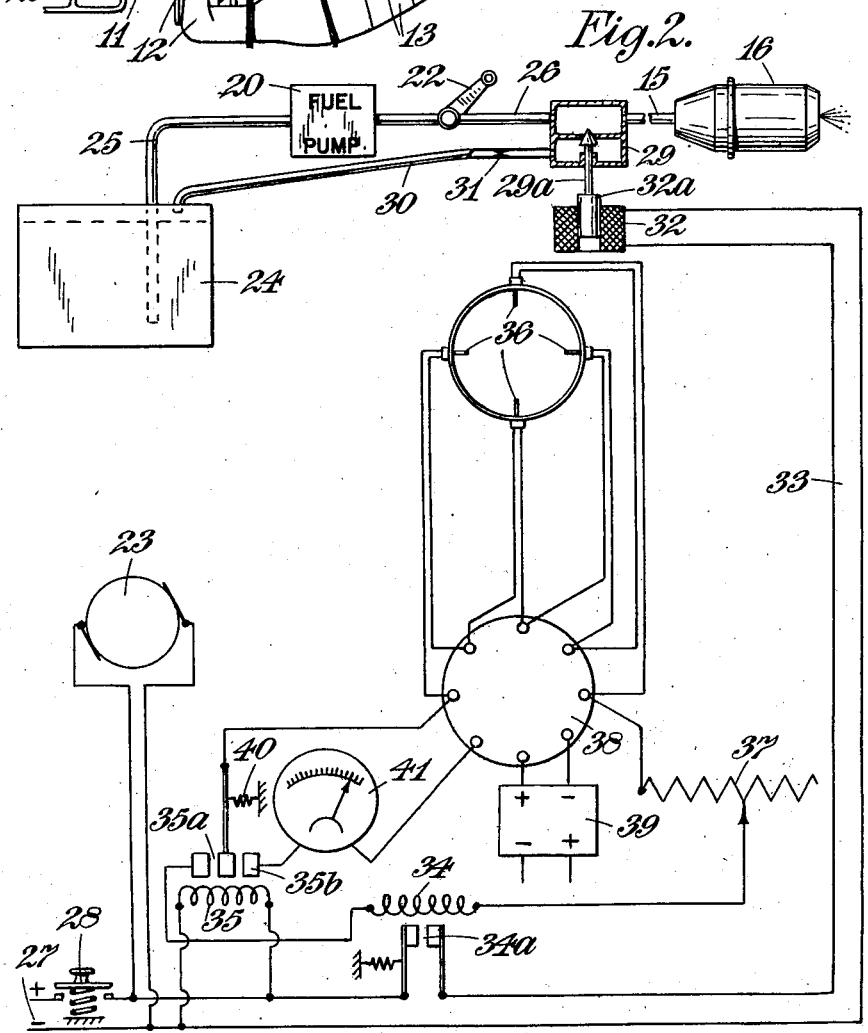
INVENTORS.
D. H. BALLANTYNE and
H. E. W. WEST
By Wilkinson & Mawhinney
Attorneys Patented Sept. 16, 1952

2,610,466

UNITED STATES PATENT OFFICE 2,610,466

GAS TURBINE ENGINE WITH STARTING DEVICE AND AUTOMATIC FUEL CONTROL MEANS

David Havelock Ballantyne, Littleover, and Harold Edward William West, Allestree, England, assignors to Rolls-Royce Limited, Derby, England, a British company Application June 24, 1949, Serial No. 101,184
In Great Britain July 2, 1948

5 Claims. (Cl. 60—39.14)

This invention relates to gas-turbines or jet-engines which incorporate a gas-turbine for driving the compressor.

During the starting cycle of a gas-turbine, a starting motor is normally used which will take the engine up to a certain cranking speed which, however, is normally not very high, as the power available is, compared with the output of the turbine, very small. It follows therefore that the turbine must be self-sustaining, i. e., be able to run under its own power, at a speed at which it can be driven by the starter motor. The combustion cycle and compressor characteristic of a gas-turbine are, however, such that at these low speeds the turbine is extremely sensitive to small changes in either fuel- or air-flow conditions. The main trouble associated with the starting of a gas-turbine engine arises from disproportionate changes of air- and fuel-flow conditions with the result that high temperatures are obtained which are detrimental to the engine.

The object of this invention is to provide an improved gas-turbine arrangement whereby these high temperatures are avoided.

According to this invention, there is provided in a gas-turbine engine fuel system an electrically-operated valve controlling a bleed from the fuel delivery of the system, and the valve is arranged to be controlled by a thermo-electric device responsive to the temperature of the hot working gases in the engine through a simple low-current operated relay. When the temperature in, say the jet-pipe exceeds a preselected value the output of the thermo-electric device operates the relay to permit a supply of current to the valve which thereby opens to bleed off an amount of fuel from the fuel delivery thus reducing the temperature of the hot working gases.

The arrangement of the invention has the advantage that the equipment necessary is relatively simple and can be readily operated by the small currents obtained from say a standard thermocouple which is preferred for use as the thermo-electric device, and that the need for valve amplifiers or the like is avoided.

The relay may conveniently be an electromagnetic relay and may be polarized.

The bleed from the delivery of the fuel system may conveniently be taken through a restricted orifice of fixed effective area so that the rate at which fuel is bled from the delivery of the fuel system when the valve is opened is dependent on the pressure in the fuel pressure supply.

One well-known construction of gas-turbine engine and the manner in which the invention may be applied to its fuel system will now be described with reference to the accompanying drawing in which:

Figure 1 is an illustration of the gas-turbine engine, and Figure 2 is a diagrammatic illustration of parts of the fuel system and a control therefor.

Referring to Figure 1, the gas-turbine engine comprises a compressor 10 having air-intakes 11 and arranged to deliver compressed air through necks 12 into a ring of combustion chambers 13 into which fuel is injected from a manifold 14 through branches 15 and injection nozzles 16 of which one is indicated. The fuel is burnt in the air in the combustion chambers 13 and the combustion products together with any excess air are delivered to a turbine 17 through a nozzle assembly 18 thereby to drive the turbine. The turbine 17 is connected with the compressor 10 through a shaft in a well-known manner to drive the compressor and the exhaust products from the turbine 17 pass into an exhaust assembly 19 comprising a jet-pipe 19a through which the exhaust gases are ejected to atmosphere at high velocity to produce a propulsive thrust.

Fuel is supplied to the fuel manifold 14 from a fuel pump 20 which is mounted on the engine and is arranged to be driven from the engine through a gearing contained in a gear case indicated at 21. The fuel supply to the manifold 14 and thus to the fuel-injectors 16 is controlled by means of a throttle 22 and conveniently, as is well-known, the fuel-pump 20 and throttle 22 are constructed as a unit to facilitate their mounting on the engine structure.

An electric motor 23 is also carried on the gear casing 21 and connected with the engine through the gears within the casing for use in starting the engine.

Referring now to Figure 2, the fuel system and starter circuits are shown diagrammatically and the fuel system comprises essentially a fuel tank 24 from which fuel is drawn off by the pump 20 through a suction line 25 and delivered through a pipeline 26 past the throttle 22 to the fuel-injectors 16.

The starter motor 23 is preferably a direct current motor and is fed through supply lines 27 from a suitable source of direct current. The supply of current to the motor 23 is controlled by a push-button switch 28.

During starting of the engine the starting motor 23 is employed to drive the engine up to a rotational speed which is not very high compared with the normal rotational speed of the engine. This is due to the fact that the power available from the motor is small compared with the power output of the turbine 17. The engine must therefore be able to run under its own power at the low speed at which it can be driven by the starter motor 23 and it has been found that the engine at this speed is very sensitive to changes in the ratio of fuel to air in the combustion equipment 13, and that serious damage often occurs to the engine due to an excess of fuel being supplied thereto resulting in high temperatures in the combustion equipment, turbine and exhaust pipe.

This invention provides a simple method of avoiding over-heating during starting of the engine, and in the illustrated embodiment the following arrangement is adopted.

A valve 29 is provided in the pipeline 26 downstream of the throttle 22 and the valve member 29a of the valve controls flow of fuel from the pipeline 26 into a bleed pipe 30 leading from the valve 29 back to the fuel tank 24. A fixed restriction 31 is provided in the bleed pipe 30 downstream of the valve 29.

The valve member 29a is carried by the armature 32a of a solenoid device 32 which is arranged to be supplied with current through supply lines 33 connected with the supply lines 27 in parallel with the motor 23. The supply to the solenoid device 32 in addition to being controlled by the push-button switch 28 is also controlled by relay contacts 34a of a low-current operated, polarised or ultra sensitive relay.

The coil 34 of the relay is connected in a circuit comprising relay switch contacts 35a, of which the operating coil 35 is connected in parallel with the starter motor 23 so as to be supplied with current when the starter motor is supplied with current, a plurality of thermo-couples 36 which are connected in series and are mounted in the wall of the jet-pipe so as to be sensitive to the temperature of the gases in the jet-pipe, and an adjustable resistance 37.

The cold junctions of the thermo-couples 36 are connected in a known manner to a cold junction compensating unit indicated at 38 and a voltage compesating unit 39 of known form is also connected to the cold junction compensating unit.

The moving contact of the contacts 35a is spring-biased by a spring 40 away from its co-operating contact by which the circuit through the relay coil 34 is completed. The resistance 37 is employed for adjusting the temperature to which the hot junctions of the thermo-couples 36 must be subjected before the contacts 34a of the low-current operating polarised relay 34 will close.

The operation of the unit just described is as follows. On starting the push-button switch 28 is closed supplying current to the starter motor 23 and to the relay coil 35, so that the contacts 35a are closed completing the circuit through the thermo-couples 36, resistance 37 and relay coil 34.

If now an excess of fuel is delivered to the engine and the temperature in the jet-pipe to which the thermo-couples 36 are sensitive exceeds a selected value, say 550° C., the current from the thermo-couples flowing through the relay coil 34 causes the contacts 34a to close so that solenoid 32 is energised and valve 29 opened to permit fuel to be bled off from the supply line 26 and conveyed back to fuel tank 24, thus reducing the fuel supply to the engine and reducing the temperature to which the thermo-couples 36 will be subjected. When the temperature to which the thermo-couples 36 are subjected falls below the selected value the contacts 34a will open and the valve 29 will be closed restoring the original fuel supply.

The rate at which fuel is bled off from the supply line 26 will be determined by the effective area of the fixed restriction 31 in the bleed pipe 30 and by the delivery pressure of the fuel pump 20.

In the construction illustrated the thermo-couples 36 are also arranged to be connected to the pilot's temperature indicator 41 during normal running of the engine and for this purpose the moving contact 35a of the relay 35, 35a is arranged when no current is flowing through the coil 35 to engage with a fixed contact 35b to complete a circuit comprising the pilot's temperature indicator 41 and thermo-couples 36. Thus during starting, the pilot's temperature indicator 41 is disconnected from the thermo-couples 36 but when the push-button starter switch 28 is open the pilot's temperature indicator 41 is connected with the thermo-couples and so becomes operative.

It will be seen that in the construction just described the relay 34, 34a is wired so as only to operate during starting.

It will be appreciated that the invention provides a simple means for avoiding excessive temperatures in the engine during starting, and that the provision of complicated equipment, such as electronic amplifiers, to operate a bleed valve from the relatively small current or voltage output of a standard thermo-couple can be avoided.

We claim:

1. A gas-turbine engine having a fuel system comprising a fuel pressure supply to the engine, a bleed pipe through which fuel can be bled off from said fuel pressure supply, a two position electrically operated valve movable between a closed position and an open position controlling the flow from said fuel pressure supply through said bleed pipe, and a fixed flow restriction in said bleed pipe whereby the rate at which fuel is bled off from the fuel pressure supply when said valve is in its open position is dependent only on the pressure in said fuel pressure supply, an electromagnet device for operating the said valve, electric supply lines to said electro-magnet device, a low-current operated relay having a coil and having contacts in said electric supply lines to control the electric supply therethrough, a thermo-electric device responsive to changes in the temperature of hot working gases in the engine and connected in series with said coil so that, when the temperature of the hot working gases exceeds a pre-selected value, said contacts are closed and current is supplied to said electro-magnet device to cause it to move said valve to its open position.

2. A gas-turbine engine as claimed in claim 1, comprising also an electric starter motor for the engine, said motor being fed with current from the current supply means for the electrically-operated valve, and starter switch means operable on starting to connect said motor and said electrically-operated valve to the current supply means.

3. A gas-turbine engine as claimed in claim 2, comprising a temperature-indicating device arranged to be connected during normal running of the engine with the thermo-electric device and relay-operated switch means operable on actuation of the starter switch means to disconnect the thermo-electric device from the temperature-indicating device and to connect it to the low-current operated relay.

4. In a gas-turbine engine, a pressure fuel supply for the engine, a bleed pipe through which fuel can be bled off from the pressure fuel supply an electrically-operated valve controlling the flow from the pressure fuel supply through the bleed pipe, a low current operated relay having a relay coil and having switch contacts connected in series with said valve, an electric starter motor for the engine connected in parallel with said switch contacts and said valve, an electric current supply line to conduct current for said electric motor and for said switch contacts and said valve, and a thermo-electric device responsive to changes in the temperature of hot working gases in the engine and connected with said relay coil so that, when the temperature of hot working gas exceeds a preselected value during starting, current is supplied to the valve to open it and fuel is bled off from said pressure fuel supply.

5. A gas turbine engine as claimed in claim 4, comprising a temperature-indicating device arranged to be connected during normal running of the engine with the thermo-electric device and relay-operated switch means operable on actuation of the starter switch means to disconnect the thermo-electric device from the temperature-indicating device and to connect it to the low-current operated relay.

DAVID HAVELOCK BALLANTYNE.
HAROLD EDWARD WILLIAM WEST.

REFERENCES CITED

The following references are of record in the file of this patent:

UNITED STATES PATENTS

| Number | Name | Date |
| --- | --- | --- |
| 2,136,959 | Winfield | Nov. 15, 1938 |
| 2,336,232 | Doran | Dec. 7, 1943 |
| 2,405,888 | Holley | Aug. 13, 1946 |
| 2,478,909 | Flagle | Aug. 16, 1949 |

FOREIGN PATENTS

| Number | Country | Date |
| --- | --- | --- |
| 605,093 | Great Britain | July 15, 1948 |